US009462435B2

(12) United States Patent
Anisimov et al.

(10) Patent No.: US 9,462,435 B2
(45) **Date of Patent: *Oct. 4, 2016**

(54) SYSTEM AND METHODS FOR INTEGRATING SHORT MESSAGE SERVICE MESSAGING WITH CONTACT CENTER APPLICATIONS

(71) Applicant: GENESYS TELECOMMUNICATIONS LABORATORIES, INC., Daly City, CA (US)

(72) Inventors: Nikolay Anisimov, Concord, CA (US); Yevgeniy Petrovykh, Walnut Creek, CA (US); Sergey B. Belov, Walnut Creek, CA (US); Mark Scott, Kirkland, WA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,602

(22) Filed: Jan. 22, 2014

(65) Prior Publication Data

US 2015/0018022 A1 Jan. 15, 2015

Related U.S. Application Data

(63) Continuation of application No. 13/537,681, filed on Jun. 29, 2012, now Pat. No. 8,718,690, which is a continuation of application No. 12/482,745, filed on Jun. 11, 2009, now Pat. No. 8,229,484.

(51) Int. Cl.
*H04W 4/00* (2009.01)
*H04W 4/14* (2009.01)

(Continued)

(52) U.S. Cl.
CPC ............ *H04W 4/14* (2013.01); *H04L 12/5895* (2013.01); *H04L 51/38* (2013.01); *H04M 3/5183* (2013.01);

(Continued)

(58) Field of Classification Search
USPC .................. 455/466, 414.4, 137, 177.1, 273; 379/88.13
See application file for complete search history.

(56) References Cited

U.S. PATENT DOCUMENTS 6,314,108 B1 11/2001 Ramasubramani et al.
7,058,036 B1 * 6/2006 Yu et al. ........................ 370/335

(Continued)

FOREIGN PATENT DOCUMENTS

| | | |
|---|---|---|
| CN | 102461098 A | 5/2012 |
| EP | 2 441 222 B1 | 3/2014 |

(Continued)

OTHER PUBLICATIONS

Notice of Reason for Refusal mailed Nov. 19, 2013 by the Japanese Patent Office for JP Application No. 2012-514999, with English translation, 6 pages.

(Continued)

*Primary Examiner* — Shahriar Behnamian
(74) *Attorney, Agent, or Firm* — Lewis Roca Rothgerber Christie LLP

(57) ABSTRACT

A system for routing short message service (SMS) messages to endpoints in a contact center includes a first node for receiving SMS message streams from multiple sources operating variant protocols and for multiplexing the multiple streams into a single message stream following a universal protocol, a media gateway server connected to the first node for receiving the single message stream and for forwarding individual ones of the messages therein to individual ones of a plurality of connected servers, and a router connected to at least one of the connected servers for routing individual messages represented therein to individual ones of a plurality of network-supported endpoint devices.

18 Claims, 6 Drawing Sheets

200
SMS Message Stream
110
201
Incoming Message Queue
202
112
Mode Differentiator
Message Processing Layer
203
Paging Request
Chat Request
Outbound SMS
205
204
208
Invite Response
Message Router
To Servers
206
SMS Request Queues
207
209
210
Chat Server Selector
111
Chat Session Initiation Layer
114
Pair Association Table
211
Chat Sessions Pool

(51) Int. Cl.

| | |
|---|---|
| ***H04M 3/51*** | (2006.01) |
| ***H04W 40/02*** | (2009.01) |
| *H04L 12/18* | (2006.01) |
| *H04L 12/58* | (2006.01) |
| *H04W 88/16* | (2009.01) |

(52) U.S. Cl.

CPC ........... *H04M 3/5191* (2013.01); *H04W 40/02* (2013.01); *H04L 12/1822* (2013.01); *H04L 12/589* (2013.01); *H04W 88/16* (2013.01)

(56) References Cited

U.S. PATENT DOCUMENTS

| | | | | |
|---|---|---|---|---|
| 7,454,195 | B2 | 11/2008 | Lewis et al. | |
| 7,623,526 | B2 * | 11/2009 | Rangel et al. | 370/395.5 |
| 8,073,473 | B2 | 12/2011 | Huggett | |
| 8,229,484 | B2 | 7/2012 | Anisimov et al. | |
| 2003/0153302 | A1 * | 8/2003 | Lewis et al. | 455/412 |
| 2003/0185379 | A1 * | 10/2003 | O'Connor et al. | 379/265.02 |
| 2003/0193967 | A1 * | 10/2003 | Fenton et al. | 370/490 |
| 2007/0191035 | A1 * | 8/2007 | Huggett | 455/466 |
| 2008/0002822 | A1 | 1/2008 | Petrovykh | |
| 2012/0270580 | A1 | 10/2012 | Anisimov et al. | |

FOREIGN PATENT DOCUMENTS

| | | | |
|---|---|---|---|
| JP | 2000-078207 | A | 3/2000 |
| JP | 2000-231520 | A | 8/2000 |
| JP | 2005-084739 | A | 3/2005 |
| JP | 2006-217099 | A | 8/2006 |
| JP | 2012-529850 | A | 11/2012 |
| KR | 10-1361726 | B1 | 2/2014 |
| WO | WO 2007/119902 | A1 | 10/2007 |
| WO | WO 2010/144299 | A1 | 12/2010 |

OTHER PUBLICATIONS

Office action for Korean Patent Application No. 10-2011-7029352 issued on Apr. 12, 2013 with partial English translation, pp. 1-4.

International Search Report for PCT/US2010/037271, mailed on Sep. 3, 2010, 3 pages.

International Preliminary Report on Patentability and Written Opinion for PCT/US2010/037271, issued on Dec. 12, 2011, 5 pages.

Japanese Office action (Decision of Rejection) with English Translation for Application No. 2012-514999, dated Nov. 20, 2014; 4 pages.

SIPO; Chinese Office action with English Translation for Application No. 201080025925.1, dated Dec. 4, 2013, 14 pages.

SIPO; Chinese Office action with English Translation for Application No. 201080025925.1, dated Oct. 11, 2014, 7 pages.

* cited by examiner

SYSTEM AND METHODS FOR INTEGRATING SHORT MESSAGE SERVICE MESSAGING WITH CONTACT CENTER APPLICATIONS

CROSS-REFERENCE TO RELATED APPLICATIONS

The present application is a continuation of U.S. application Ser. No. 13/537,681 filed on Jun. 29, 2012, which is a continuation of U.S. application Ser. No. 12/482,745 filed on Jun. 11, 2009 (now U.S. Pat. No. 8,229,484), the content of all of which are incorporated herein by reference.

BACKGROUND OF THE INVENTION

1. Field of the Invention

The present invention is in the field of telephony communications including electronic messaging and pertains particularly to methods and apparatus for integrating short message services within a contact center routing environment.

2. Discussion of the State of the Art

In the art of telephony communications, organizations selling products and service often utilize telecommunication contact center services for interacting with their customers. A state-of-art contact center can field communications incoming from a variety of disparate networks. Telephone calls incoming to a contact center access point, generally a CTI-enabled telephone switch or a switch implemented in software, may source from analog or digital networks. In addition to voice calls, which may include plain old telephone service (POTS) calls and data network telephony (DNT) calls, email routing systems are known to the inventors for fielding and internal routing of incoming email messages from customers.

Routing in a contact center is computer aided or more particularly, computer telephony integrated (CTI). Routing strategies are expressed as one or a series of routing objects that may be served upon request from a routing node. Access points to the center may include Web-based contact points for both voice calls and electronic messaging (email, instant message), as well as chat services. Therefore, a contact center presents multiple communication channels that reflect the various forms of communication and interaction available at the center.

Users are increasingly mobile in today's marketplace and are increasingly using wireless cellular telephones over land-line telephones to interact with businesses. A limited form of peer-to-peer messaging has been developed for wireless users termed short message services (SMS) in the art. SMS messaging is limited to a maximum number of characters and does not support multimedia attachments. However, Multimedia Messaging Services (MMS) is an extension of SMS that does support multimedia attachments. SMS is a peer-to-peer service that runs over short message peer-to-peer protocol (SMPP) or some proprietary version of the protocol dependant upon the service provider.

The popularity and use of SMS is growing and it has occurred to the inventors that it would be desirable for a state-of-art call center to be able to integrate short message service (SMS) messaging with various call center systems and applications. However, due to the session-less nature of SMS messaging over peer-to-peer protocol, the conventional means for routing interactions within a call center do not include support for SMS interaction between mobile users and call center systems or agents.

Therefore, what is clearly needed is a system for routing short message service (SMS) messages to endpoints in a contact center such that SMS interaction between mobile users and contact center resources can be conducted within the contact center environment.

SUMMARY OF THE INVENTION

The problem stated above is that it is desirable for a call center to be able to integrate short message service (SMS) messaging with various call center systems and applications. However, due to the session-less nature of SMS messaging over peer-to-peer protocol, the conventional means for routing interactions within a call center do not include support for routed SMS interaction between mobile users and call center systems or agents.

The inventors therefore considered functional elements of mobile networks and call centers looking for elements that exhibit interoperability that could potentially be harnessed to provide a SMS channel capability within a call center that includes agent level routing (ALR) but in a manner that would support session oriented communication applications without creating communication device or interface limitations.

Every call center is subject to a continued stream of incoming communication events, one by product of which is continued need for automated event processing. Most call centers employ a host of routers, servers, and network lines connected to endpoint devices and systems to efficiently handle the incoming communication load on the center. Call center applications that provide single point interfacing for call center resources are typically a part of such apparatus.

The present inventor realized in an inventive moment that if, within the call center domain, SMS messages could be routed and supported by call center equipment and applications, significant expansion of communication capability of the center would result. The inventor therefore constructed a unique system for integrating SMS message technology and call center routing and interaction processes that allowed mobile users to interact with call center systems and agents using SMS messaging. A significant increase in communication flexibility results within the call center with no impediment to workflow or call handling efficiency.

Accordingly, in an embodiment of the present invention a system is provided for routing SMS messages to endpoints in a contact center. The system includes a first node for receiving SMS message streams from multiple sources operating variant protocols and for multiplexing the multiple streams into a single message stream following a universal protocol, a media gateway server connected to the first node for receiving the single message stream and for forwarding individual ones of the messages therein to individual ones of a plurality of connected servers, and a router connected to at least one of the connected servers for routing individual messages represented therein to individual ones of a plurality of network-supported endpoint devices.

In one embodiment the multiple sources include one or more short message service centers (SMSCs) and one or more mobile network modems. In one embodiment the universal protocol is hypertext transport protocol (HTTP). In another embodiment the universal protocol is short message peer-to-peer (SMPP) protocol.

In a preferred embodiment one or more of the connected servers are chat servers and the endpoints include chat sessions. In this embodiment the chat sessions include sessions in progress and sessions created upon request. In one embodiment the connected servers include at least one interaction server for representing SMS message events pending further routing. In this embodiment the endpoint devices include computing devices and the endpoints are applications running on the computing devices.

According to another aspect of the invention, a method for establishing a chat session between a call center agent and a mobile user is provided including the steps (a) receiving a SMS request from the mobile user indicating a desire to chat, (b) checking an identification parameter of the mobile user against a pool of identification parameters of mobile users engaged in chat sessions, (c) upon an unsuccessful match of identification parameters in step (b), sending a request to an active chat server to create a chat session, and (d) at the chat server, generating a session identification number and opening a communication channel between the mobile user and the agent selected to host the chat session.

In one aspect of the method in step (a), the indication of the desire to chat is a destination telephone number assigned to chat services. In another aspect the indication of the desire to chat is the presence of the word chat in the message body. In one aspect of the method in step (b), the identification parameter is or includes a telephone number. In one aspect of the method steps (a), (b), and (c) are performed by an embedded server page (ESP) server running on a media gateway.

According to another aspect of the invention, a method for routing an SMS message from a mobile user to a chat session in progress between the mobile user and a call center agent is provided including the steps (a) receiving the SMS message at a media gateway, (b) checking an identification parameter of the mobile user against a pool of identification parameters of mobile users engaged in chat sessions, and (c) upon a successful match of identification parameters in step (b), forwarding the message directly to the chat server and chat session matching the user.

In a preferred aspect steps (a), (b), and (c) are performed by an ESP server running on a media gateway. In one aspect in step (b), the identification parameter is or includes a telephone number. In one aspect, in step (b) each identification parameter in the pool is accompanied by a chat server identification parameter and a chat session identification parameter.

According to yet another aspect of the invention a method is provided for converting a chat session input made by a call center agent engaged in a chat session with a mobile user to an outgoing SMS message routed to the mobile user including the steps, (a) sending a request to an ESP server at a media gateway to send an SMS message, the chat session input included with an identification parameter of the recipient in the ESP request, and (b) inserting the chat session input into a message body of a generated SMS message addressed to the mobile user via the identification parameter. In one aspect of the method the request further includes a chat session identification number. In one aspect in step (b), the identification parameter is a telephone number.

BRIEF DESCRIPTION OF THE DRAWING FIGURES

DETAILED DESCRIPTION

The inventors provide a system for routing SMS messages incoming from multiple sources to contact center endpoints. The system includes support for SMS-based virtual chat services and outbound routing of SMS messages to mobile clients. The present invention is described in enabling detail in the examples below, which may include more than one embodiment of the invention.

Figure 1:
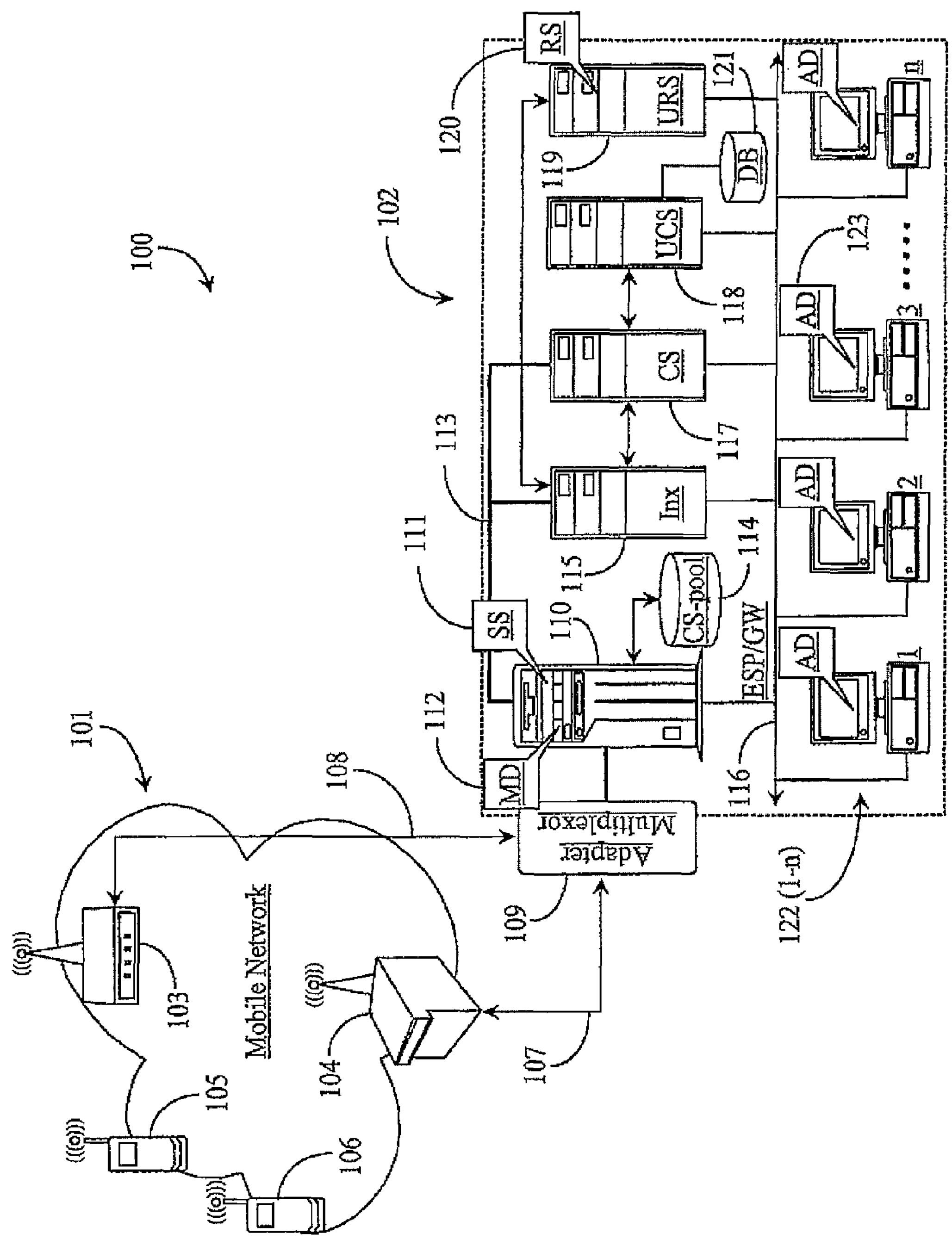
FIG. 1 is an architectural overview of a communications network supporting short message service (SMS) integration to a contact center routing system according to an embodiment of the present invention.

FIG. 1 is an architectural overview of a communications network 100 supporting short message service (SMS) integration to a contact center routing system according to an embodiment of the present invention. Communications network 100 includes at least one mobile telephone network 101 connected to a call center 102. Call center 102 may also have direct access to the well-known Internet network and the public switched telephone network (PSTN) without departing from the spirit and scope of the present invention. The inventor illustrates mobile network 101 as a source network from which SMS messages may originate. One with skill in the art of communications networks will appreciate the ambiguity of the physical boundaries of disparate networks.

Mobile network 101 supports telephony and messaging services, particularly SMS capability. Mobile network 101 includes a mobile modem 103 that represents any modem hardware through which SMS data streams may be passed onto another network, or in this case, into call center 102 via a modem trunk 108. There may be more than one modem in network 101 without departing from the spirit and scope of the invention. One example of modem hardware that may be included within network components inside network 101 is a Global System for Mobile communications (GSM) mobile modem.

Mobile network 101 includes at least one short message service center (SMSC) 104. SMSC 104 provides SMS services to mobile clients and may function to route SMS messages into contact center 102 via a SMSC trunk 107. A mobile telephone 105 and a mobile telephone 106 are illustrated within network 101 and represent mobile telephones of users or potential customers of contact center 102. Mobile telephones 105 and 106 may represent all mobile users that may access contact center 102 via a mobile modem such as modem 103 or via a SMSC such as SMSC 104. Therefore, there may be multiple SMS streams incoming into contact center 102. The SMS streams may be supported by different proprietary versions of SMPP protocols.

In this embodiment a protocol adapter 109 is provided as an intermediate node between mobile network hardware and a SMS media gateway 110 provided within call center 102. Protocol adapter 109 is also a data stream multiplexer. Protocol adapter 109 multiplexes multiple incoming SMS data streams into a single SMS data stream operating according to a standard unified format such as a well-defined SMPP specification, or some other data transport protocol such as hypertext transport protocol (HTTP). It is important to note herein that protocol adapter 109 supports simultaneous connections with multiple specialized hardware units like mobile modem 103 and multiple SMSCs like SMSC 104.

Output of protocol adapter 109 consists of a single SMS data flow under a unified protocol. SMS media gateway 110 is located within contact center 102 and has connection to a local area network (LAN) 116 operating in the center. SMS gateway 110 is a unique gateway combining an embedded server page (ESP) server with other functions such as parsing SMS messages for intention and selecting appropriate servers to which to forward SMS messages. More detail about the capabilities of SMS media gateway 110 is provided later in this specification. In this example, protocol adapter 109 is directly connected to SMS media gateway 110 via a data network line.

LAN 116 supports a number of specialized nodes within contact center 102. It is noted herein that each specialized node is logically illustrated herein to simplify description. In actual practice functionality of the system of the invention may be implemented on a single node or on a few nodes in various combinations without departing from the spirit and scope of the present invention. It is also noted herein that any physical node represented in the examples presented herein shall be assumed to have access to an internal or external digital medium and processing resources.

SMS media gateway 110 is the first specialized node that incoming SMS messages enter for processing. SMS media gateway 110 has a digital (machine-readable) medium and processor resources available for storing applications and executable modules and for executing software to perform functions of the invention. In a preferred embodiment SMS messages incoming into contact center 102 are routed according to an intelligent routing strategy implemented within the center. Routing of messages begins within SMS media gateway 110. In a preferred embodiment SMS messages incoming into SMS media gateway 110 are treated according to one of a number of predefined modes reflecting intent of the SMS messages.

SMS media gateway 110 includes a mode differentiator (MD) 112 provided thereto and adapted to determine the intent (mode) of an incoming SMS message. For example, the contact center might advertise two SMS destination numbers (telephone numbers) or addresses (IP addresses). One destination number or address may be a number that signifies or is assigned to chat services while the other number or address may be one that signifies or is assigned to paging services. MD 112 may be adapted or configured to check each incoming SMS message to determine the destination number or address of the message thereby determining the mode of the message as a chat request or a paging request.

Mode for an SMS message may be predefined in other ways. In one embodiment an SMS message is determined by MD 112 to be a chat request if the term "chat" is found in the body of the message by a message parser (not illustrated). In this case if MD 112 does not find the term chat in the message body then the message mode is determined to be a paging mode. In a preferred embodiment SMS integration into contact center 102 includes a chat mode where a mobile client such as one using mobile telephone 105 may send SMS messages to a chat server and get SMS replies from the chat server. The replies may be crafted by a live agent or, perhaps by an intelligent response system. In this example, paging mode is defined as a simple exchange of SMS messages between a mobile client like one operating mobile telephone 106 and a contact center agent or intelligent response system.

Instead of peer-to-peer messaging, which is session-less in nature and cannot be controlled or monitored in a contact center environment, the SMS messages incoming to SMS media gateway 110 are routed internally to contact center endpoints such as available chat servers, the endpoints being active chat sessions hosted on those servers or an available interaction server (known to the inventors) depending on the mode of the SMS message. An interaction server (Inx) 115 is illustrated within contact center 102 and connected to LAN 116. Interaction server 115 has digital medium and processing resources available to it for storing applications and for executing applications in the process of practicing the present invention.

Interaction server 115 is adapted to represent interaction events of any supported media type within the contact center in an abstract way as an open media type interaction. SMS messages received by SMS media gateway 110 that are determined to be of the type paging mode are routed to interaction server 115 for further processing. In this case available endpoint systems may include LAN connected computers wherein the endpoints are agent desktop applications running on those computers. Interaction server 115 may be connected to SMS media gateway by a separate data network 113. Paging mode implies an incoming SMS message from a mobile client that seeks a response in the form of an SMS message from an agent or from an intelligent response system.

A chat server (CS) 117 is illustrated within contact center 102 and is adapted to host agent-moderated chat sessions. CS 117 has digital medium and processing resources available for storing data and for executing and maintaining chat services implemented in software. SMS media gateway 110 is capable of initiating chat sessions by request sent to one of a possible number of available chat servers analogous to CS 117 and of forwarding SMS messages relative to any existing chat sessions directly to the host chat server.

A server selector 111 is provided on SMS media gateway 110 and is adapted to switch server connections between multiple chat servers that are listed in a connections list within the gateway and available to server selector 111. A simple switching algorithm may be provided to switch from one server connection to another to distribute new sessions across the multiple servers in a way that balances the loads on the servers. Multiple chat servers may be provided within contact center 102 without departing from the spirit and scope of the present invention. CS 117 is connected to SMS media gateway 110 via data network 113 in this example. CS 117 is also connected to LAN 116 in this example. In one embodiment of the invention Inx server 115 has a direct network connection to CS 117.

LAN 116 supports a universal routing server (URS) 119 in this example, which is adapted to provide intelligent routing strategy to Inx server 115 for routing of all interactions of any supported media type. URS 119 has digital medium and processing resources available for storing routing information and for executing routing routines to provide routing instruction to requesting nodes, in this case Inx server 115. URS 119 has routing strategy (RS) 120 provided thereto, which contains the routing routines for handling SMS messages routed to Inx server 115 and for outgoing SMS messages generated by Inx server 115 and destined for mobile clients.

LAN 116 supports a number of agent workstations illustrated herein as agent workstations 122 (1-*n*). Each station is depicted in this example as a personal computer having a graphics user interface (GUI). In actual practice each agent station may also include a system telephone (not illustrated) such as a PBX telephone or IP telephone application running on the personal computer. Each agent station computer has digital medium and processing resources available for storing software and information and for executing applications. Each agent station computer has an agent desktop application (AD) 123 installed thereon and executable there from or from an associated processing resource. AD 123 is adapted to enable the agent to engage contact center resources and processes including routing capability, incoming interaction notification, and outbound communication capabilities. AD 123 is enhanced in this embodiment with support for SMS messaging including SMS chat services support.

LAN 116 supports a universal contact server (UCS) 118, which is adapted to monitor and record interactions between customers and contact center 102 including SMS message interactions and SMS virtual chat transcripts. UCS 118 has digital medium and processing resources available for storing data and software applications and for executing and running contact center applications. UCS 118 has a database (DB) 121 associated thereto which may be hosted in an internal or external data repository. DB 121 is adapted to store contact records and interaction states between agents, systems, and customers of contact center 102.

Contact center 102 may include additional server nodes without departing from the spirit and scope of the present invention such as a configuration server, a local directory server, a local control agent (LCA) server, a session initiation protocol (SIP) server, a customer relations management (CRM) server, and like servers that may be included in state-of-art contact centers. The specialized nodes illustrated in this example play a part in the practice of the present invention; however they may not be specifically required in all embodiments where the invention is practiced. The basic configuration illustrated in this example is known to the inventors and enables unified interaction routing, queuing, and interaction management.

In this embodiment incoming SMS messages into SMS media gateway 110 are parsed for a predefined mode by MD 112. Identification of the mobile client, typically a wireless provider identification and mobile client telephone number is used to identify a mobile client to the contact center system. MD 112 determines if an incoming message is a paging request (paging mode) or a chat related message (chat mode). If a SMS is associated with chat mode, MD 112 determines if it is a chat request, a chat session response to an active SMS chat session, or an SMS response to an outbound SMS invitation to chat. A chat session pool (CS-pool) 114 is provided to SMS media gateway 110 in an internal or external data repository or digital medium. CS-pool 114 contains associated pairs of a customer (mobile client) and chat session number or identification.

In a typical implementation a SMS chat interaction is characterized in that SMS messages from a mobile client that is engaged in a current session are forwarded by SMS media gateway 110 to the appropriate chat server identified in the session pair contained in CS-pool 114 by way of data network 113. Likewise, all SMS messages from a participating agent input through AD 123 are forwarded from the chat server session to SMS media gateway 110 for send to the participating mobile client. There may be a chat session view available to the mobile client whereby the client may see the interaction transcripts as they occur. A simple message view may also be adopted whereby the mobile client only sees the previous message sent by the agent and replies to that message.

In one embodiment an SMS message may arrive at SMS media gateway 110 wherein the message is an original chat request sent from a mobile client or a response to a chat invitation previously sent to the mobile client by an agent or by an intelligent system of contact center 102. In either case there will be no matches to the mobile client in CS-pool 114 because no session is yet initiated for the client. In the case of an original request to chat the SMS media gateway selects an available chat server to host the pending session and then requests that a new session be created for the mobile client. An agent is selected to moderate the chat session by routing routine execution. In one embodiment agents are selected from an available agent pool to moderate new chat sessions based on some routing intelligence like selecting an agent based on skills match to chat topic. In one embodiment an agent is selected at random from a pool of available agents subscribing for chat service moderation.

Once the chat session is created, an association pair is created at SMS media gateway 110 and is stored in CS-pool 114. New messages from the mobile client are then routed directly to the appropriate chat server and session the client is participating in. All messages generated by an agent moderating a SMS chat session are first sent to Inx server 115, which determines by mobile client ID and chat session number, which chat server and session to send the SMS message to. The chat server may then forward the outbound SMS message to SMS media gateway 110. Gateway 110 may then route the message on to the mobile client. In one embodiment the SMS media gateway validates the outgoing SMS message to the mobile client by checking the message destination (mobile client ID) against the chat session pool.

In one embodiment SMS media gateway 110 applies a time window for SMS message intervals relative to an ongoing chat session between a mobile client and an agent of contact center 102 listed in CS-Pool 114. In this embodiment A SMS message sent from a mobile client to a chat session is validated once against CS-pool 114 and further messages from the same mobile client are automatically routed directly to the identified chat session as long as the message is received at SMS media gateway 110 within a specified time window from the last message received and routed to the session. Likewise, the time frame may also be applied to outbound SMS messages from the session to the identified mobile client.

In the above embodiment controls may be provided for a mobile client and/or a participating agent to pause or save an active chat session in persistent storage until it is again resumed. A mobile client identified by a mobile telephone number and an SMS service provider may participate in more than one active chat session provided that each session has a unique identification parameter for the client. This may be accomplished by adding a unique chat name or handle for each active session. A different session ID is provided for each separate chat session and each separate chat session is moderated by a different agent. In this way a mobile client may discuss a number of different topics in a highly interactive chat mode, pausing current session and resuming another one. An agent participating in a registered chat session may pause the session, for example while performing some other task, and then resume the session when the task is completed.

Agent desktop (AD) applications 123 have connection to Inx server 115 and UCS 118 via LAN 116 in this example. AD 123 includes software that supports SMS messaging protocol and chat protocol so that an agent may participate in chat session through the AD application and send outbound SMS messages to mobile clients. In one embodiment an agent may send an outbound SMS message to a mobile client which is an invitation to chat. The message is initiated on AD 123 and sent to Inx server 115.

Inx server 115 requests routing instruction from URS 119 for sending an SMS message to a mobile client. Inx server 115 forwards the chat invite request to SMS media gateway 110. When the gateway receives the request, it creates a pending or "sleeping" chat session using the identification of the intended mobile recipient identified in the request from the interaction server. A request to an available chat server to initiate a session is delayed. SMS media gateway 110 generates and sends an SMS chat invitation to the intended mobile recipient such as one operating mobile telephone 105. A time limit may be enforced relative to receipt at SMS gateway 110 of a responding SMS message from the mobile client operating telephone 105. Once a response is received at the gateway from the mobile client, a request is sent from SMS gateway 110 to an available chat server to create a new chat session. Once the chat session is established and the agent is notified of the acceptance, SMS gateway 110 enables the forwarding process of SMS messages relative to the active chat session.

A SMS message that is received at SMS media gateway 110 that is not identified as a chat session message, a new request to chat, or a response to a chat invitation is deemed a paging request. In one embodiment a mobile client such as one operating mobile telephone 106 sends the SMS message to an advertised telephone number or address that may indicate a paging mode. In another embodiment paging mode is assumed if chat mode is not implied. SMS media gateway 110 forwards a paging SMS message to Inx server 115 for further routing. Inx server 115 requests routing instruction from URS 119 to find an available agent or intelligent response system to whom to route the message.

In the case of a live agent, the SMS notification is sent to AD 123 of the targeted agent. The agent may then use AD 123 in SMS mode to craft a response to the received SMS message body. The response is sent to Inx server 115 and is then forwarded to SMS media gateway 110 in the form of a request to send an SMS to the mobile client identified in the request. SMS gateway 110 generates and sends the SMS with the agent input as the message body. The request and response is considered a complete transaction for paging. In chat mode an entire chat session is considered a complete transaction.

Figure 2:
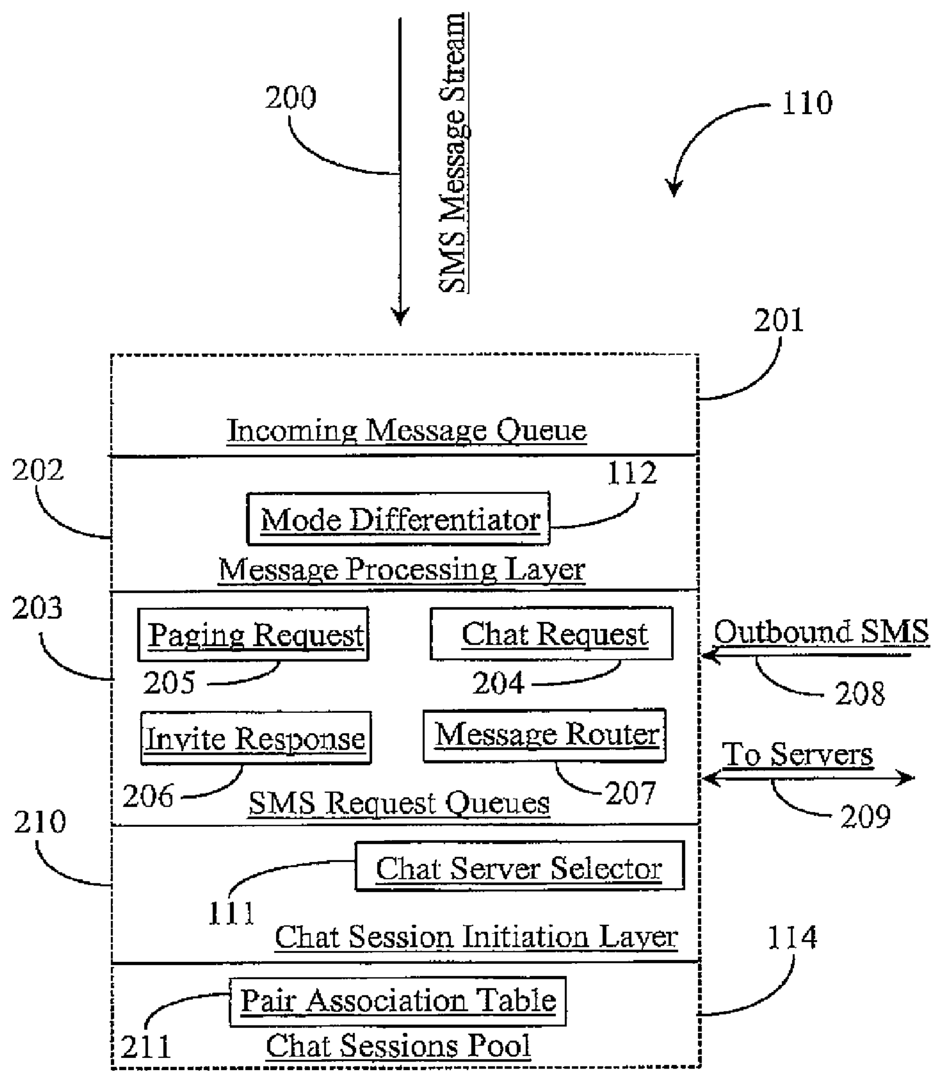
FIG. 2 is a block diagram illustrating basic components of the SMS media gateway of FIG. 1 according to an embodiment of the present invention

FIG. 2 is a block diagram illustrating basic components of SMS media gateway 110 of FIG. 1 according to an embodiment of the present invention. SMS media gateway 110 includes mode differentiator 112 and chat server selector 111 described further above. SMS gateway 110 includes an incoming message queue or buffer 201 for temporarily queuing incoming SMS messages.

It is noted herein that SMS media gateway 110 does not include persistent storage for SMS messages in this example. However, it is noted that a persistent storage system may be provided to SMS gateway 110 without departing from the spirit and scope of the present invention. It is generally desired that SMS gateway 110 process and route SMS messages in near real time. SMS media gateway 110 includes a message processing layer 202, which includes the mode differentiator 112. Mode differentiator 112 determines what mode (chat or paging) an incoming SMS message is assigned. Incoming SMS message stream 200 is a single stream multiplexed from two or more SMS data streams.

In one embodiment SMS media gateway 110 includes a SMS request queues layer 203 containing dedicated message queues of limited size. Illustrated queues in this layer include a chat request queue 204 for incoming SMS messages that are original chat requests. A paging request queue 205 is provided for queuing incoming messages that are not chat related. An invitation response queue 206 is provided for queuing messages that are responses to outbound chat invitation messages sent to mobile clients. Mode differentiator 112 may provide the message sorting and queuing services. An outbound SMS message queue may be provided in SMS gateway 110 without departing from the spirit and scope of the present invention. In one embodiment incoming SMS messages are only queued for message processing in incoming message queue 201. After processing the messages may be immediately forwarded to endpoints without queuing.

In one embodiment layer 203 includes a message router 207. Message router 207 is adapted to route messages to servers within the contact center. In this example available servers are one or more chat servers and an interaction server analogous to chat server 117 and Inx server 115 of FIG. 1. Message router 207 may communicate with server selector 111 to route messages from queues 204 and 206 to available chat servers or servers selected by server selector 111. As described further above, server selector 111 may use a simple algorithm to load balance sessions among multiple available chat servers. In one embodiment message router 207 and server selector 111 are combined as one module. A more complicated algorithm linking available servers to specific agents may be provided instead of a simple round-robin switch.

SMS gateway 110 includes a chat session initiation layer 210 adapted to enable new chat session requests to be generated and sent to available chat servers in order to create new chat sessions for mobile clients requesting chat or responding timely to a chat invitation. Chat related SMS messages are forwarded to appropriate chat servers over data line 209. Page messages are forwarded to an Inx server over data line 209. Outbound SMS messages from the Inx server arrive at SMS gateway 110 over data line 208.

SMS gateway 110 includes chat sessions pool 114 adapted to store active chat sessions. A pair association table 211 is provided to list each active chat session by mobile client identification parameters (SMS service carrier and telephone number) and server identification and session number. In one embodiment a mobile client identification parameter includes a name or handle assigned to an active session so that the client may hold more than one simultaneous SMS chat session. In one embodiment a chat session may include multiple mobile clients where the session is moderated by a single call center agent. In this embodiment an SMS request for a "new" chat session may be routed to an existing active session if the active session is topically the same or similar to the topic that the mobile client is interested in.

An intelligent response system may, in one embodiment, be used to moderate a chat session where the system is connected to a knowledge base and can summarize a response to fit the character limit requirements of an SMS message. In this embodiment the system is enhanced to parse the message received in the chat session for content and to search the knowledge base for an answer to the question or for data fulfilling a need of the message body parsed by the system. An intelligent response system may also be provided to handle SMS pages where a live agent is not required to answer the question or to fulfill the need of the message.

Figure 3:
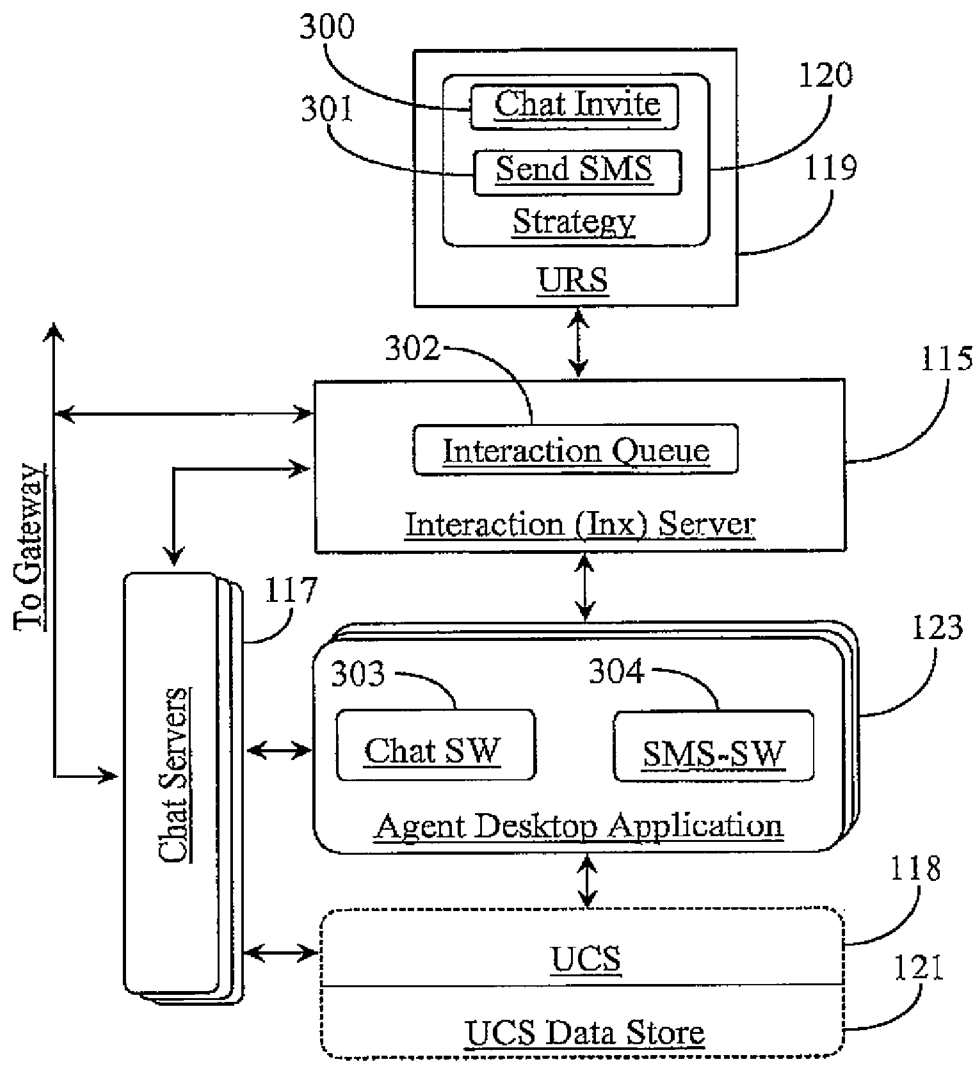
FIG. 3 is a block diagram illustrating component interaction according to an embodiment of the present invention.

FIG. 3 is a block diagram illustrating component interaction according to an embodiment of the present invention. Agent desktop applications 123 provide the interface for agents to practice SMS messaging in the contact center environment where the interactions can be routed monitored and recorded. Each agent desktop application includes chat software (SW) 303 and SMS software (SW) 304. SMS SW 304 enables an interface for the agent to input text following an SMS generic protocol that can be converted to proprietary SMS formats for forwarding to mobile clients. A well-understood SMPP protocol may be used. In one embodiment the protocol for displaying SMS messages is HTTP. Other generic protocols may be used. The adapter and lines multiplexer ahead of the SMS media gateway converts the protocol for incoming and outgoing SMS messages. The interface allows the agent to receive SMS messages that display in the interface on the agent's computer.

Agent desktop application(s) 123 has connections to chat server(s) 117, interaction server 115, and universal contact server (UCS) 118. Interaction server 115 has a connection to universal routing server 119 and a connection to chat server(s) 117. Both chat server(s) 117 and interaction server 115 are connected to the SMS media gateway. An agent engaged in an active chat session with a mobile client may send SMS messages directly to the chat session hosted in the appropriate chat server 117 whereby the chat server forwards the SMS response directly to the SMS gateway for processing.

An agent operating agent desktop application(s) 123 may also originate outbound SMS messages with the aid of SMS-SW 304. These outbound SMS messages are sent in paging mode to interaction server 115 to await routing instruction from URS 119. Routing strategy 120 contains a routing object 300, which is an invitation to chat. Routing strategy 120 contains a routing object 301, which is a send SMS message command. Other routing strategies may also be included in this example without departing from the spirit and scope of the present invention.

Interaction server has a general interaction queue 302 adapted to contain interaction requests of different supported media types including SMS messaging. In one embodiment all outbound chat session responses, paging responses, and outbound invitations are handled in interaction server 115 whereby each message waits for routing instruction before being forwarded from interaction server 115 to the SMS gateway for further processing before being forwarded to associated mobile clients. In this case the SMS gateway forwards incoming SMS messages that are active chat session responses directly to the appropriate chat server and session.

If the SMS gateway receives a SMS message requesting a "new" chat session where no chat session exists in the chat session pool at the gateway, then the SMS gateway may forward the request to interaction server 115 for routing and the routing instruction may provide the data for connection to an available chat server where the session may be initiated and an agent may be found to moderate the session. Further SMS responses from the mobile client received at the gateway and destined for the chat server and session are forwarded directly to the chat session. The agent can see the SMS messages from the mobile client in the agent desktop chat interface and can input responses through the same interface.

Figure 4:
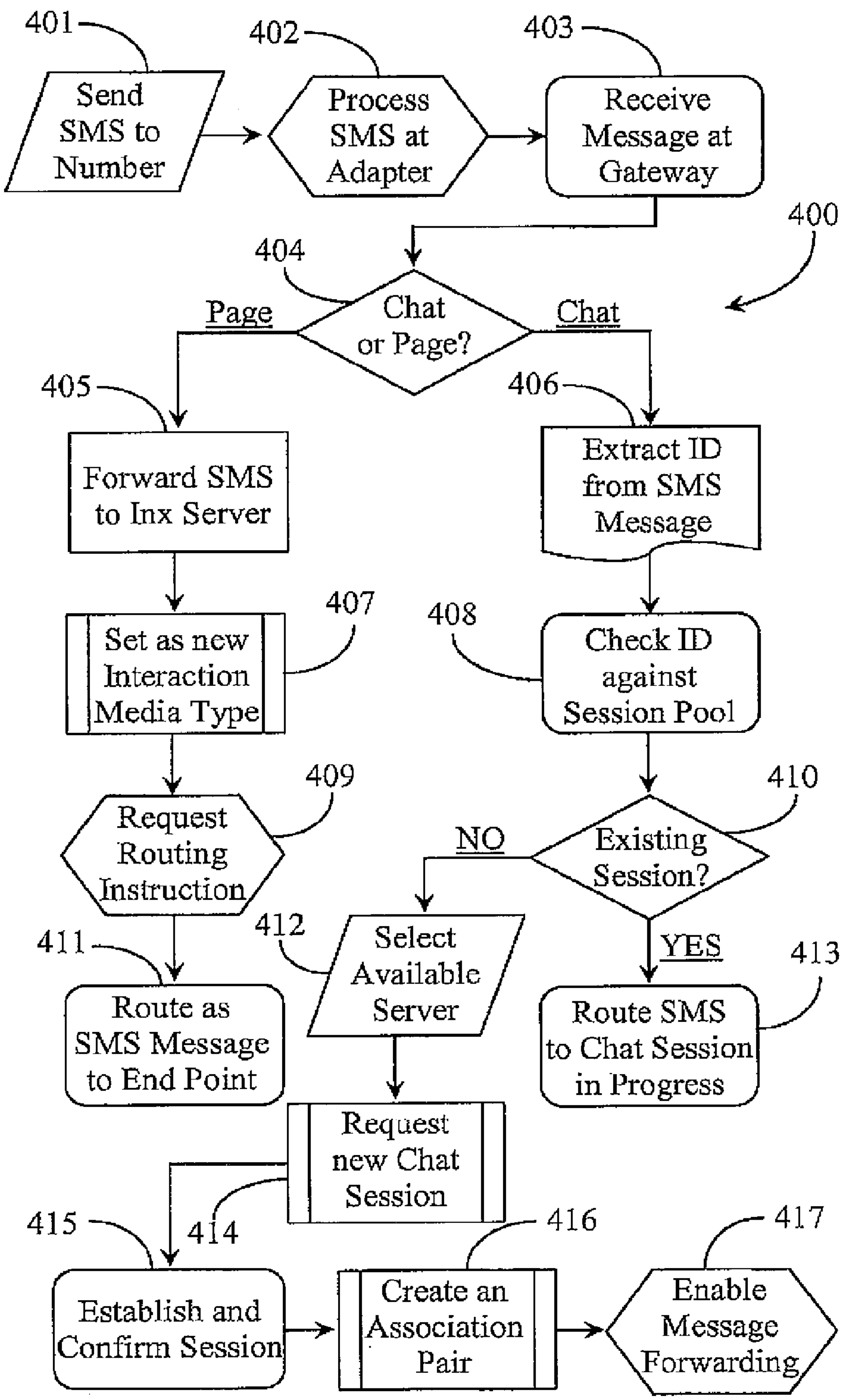
FIG. 4 is a process flow chart illustrating steps for handling incoming SMS messages in a contact center according to an embodiment of the present invention.

FIG. 4 is a process flow chart illustrating steps 400 for handling incoming SMS messages in a contact center according to an embodiment of the present invention. At step 401, a mobile client operating a cellular telephone capable of SMS messaging sends an SMS message to a provided telephone number. The provided telephone number may be one that is advertised to the public and linked to a predefined mode for the message. The destination number dialed by the mobile client is registered at an SMS media gateway analogous to gateway 110 of FIG. 1.

At step 402 the message sent from the mobile client is received at an intermediate protocol adapter and lines multiplexer for further processing. This adapter is analogous to adapter/multiplexer 109 of FIG. 1. The adapter converts various proprietary SMS protocols to a unified protocol for presentation within the contact center environment. A unified protocol may be a generic SMPP protocol or some other standard protocol, such as HTTP over which SMS messages may be transferred in a unified format.

At step 403 the SMS message sent at step 401 arrives at an SMS media gateway analogous to SMS media gateway 110 of FIG. 1. In this step the gateway identifies the mobile client and SMS carrier and may parse all or part of the SMS message for information. At step 404 the gateway determines with the aid of a mode differentiator module whether the SMS message being processed can be classed as chat mode or paging mode.

If the SMS message is determined to be a paging message, the SMS media gateway forwards the message at step 405 to an interaction server for further processing. The message may be queued in a general message queue to await routing instruction. At step 407 the interaction server sets the interaction as a new interaction of type SMS paging mode.

At step 409 the interaction server requests routing instruction from a connected universal routing server. Routing endpoint in this case may be one of a number of agent desktop applications adapted for SMS interaction. The routing server may select an available agent based on information about the SMS message such as content, information about the originator of the message, or determination of a particular skill set required for handling the message intent appropriately. In one embodiment the interaction is simply routed to a next available agent as an SMS message in step 411.

If the system determines that the SMS message of step 401 is a chat related message (chat mode) then at step 406 the system extracts the identification from the message consisting, in one embodiment, of an SMS carrier ID and a mobile client telephone number. At step 408 the system checks the extracted identification parameters against a chat session pool containing identification parameters of participants in existing chat sessions.

At step 410 the system determines if the ID matches one in the pool indication an existing chat session in progress. If the system determines that the ID of the mobile client matches that of an existing chat session at step 410, the SMS gateway forwards the SMS message to the appropriate server and session at step 413. If the system determines that the SMS message of step 401 cannot be matched to an existing chat session in the chat session pool, then it is a new chat request. At step 412 the SMS gateway selects an available chat server to host a new chat session. The chat servers may be listed as available connections inside the gateway.

At step 414 the SMS gateway requests a new chat session be created for the mobile client that initiated the SMS message. In one embodiment the request to initiate a new chat session is routed through the interaction server so that a routing strategy may be requested to locate a chat moderator for the pending chat session. At step 415 the selected chat server establishes and confirms the new chat session. At step 416 the SMS gateway creates an associated pair consisting of the ID of the mobile client and the chat server and session ID and adds it to the chat session pool. At step 417 the SMS gateway enables message forwarding between the chat server and the mobile client for subsequent interaction. Subsequent messages received at the SMS gateway from the same mobile client may be forwarded to the newly created chat session in progress while responses from the chat server or in one embodiment, the interaction server are forwarded as SMS messages to the mobile client according to native protocol at the client.

Steps 400 include dealing with a chat session request message and simple chat response messages. Steps 400 do not account for a case where the SMS message is a response to an outbound SMS message earlier forwarded to the mobile client on behalf of an agent or intelligent response system.

Figure 5:
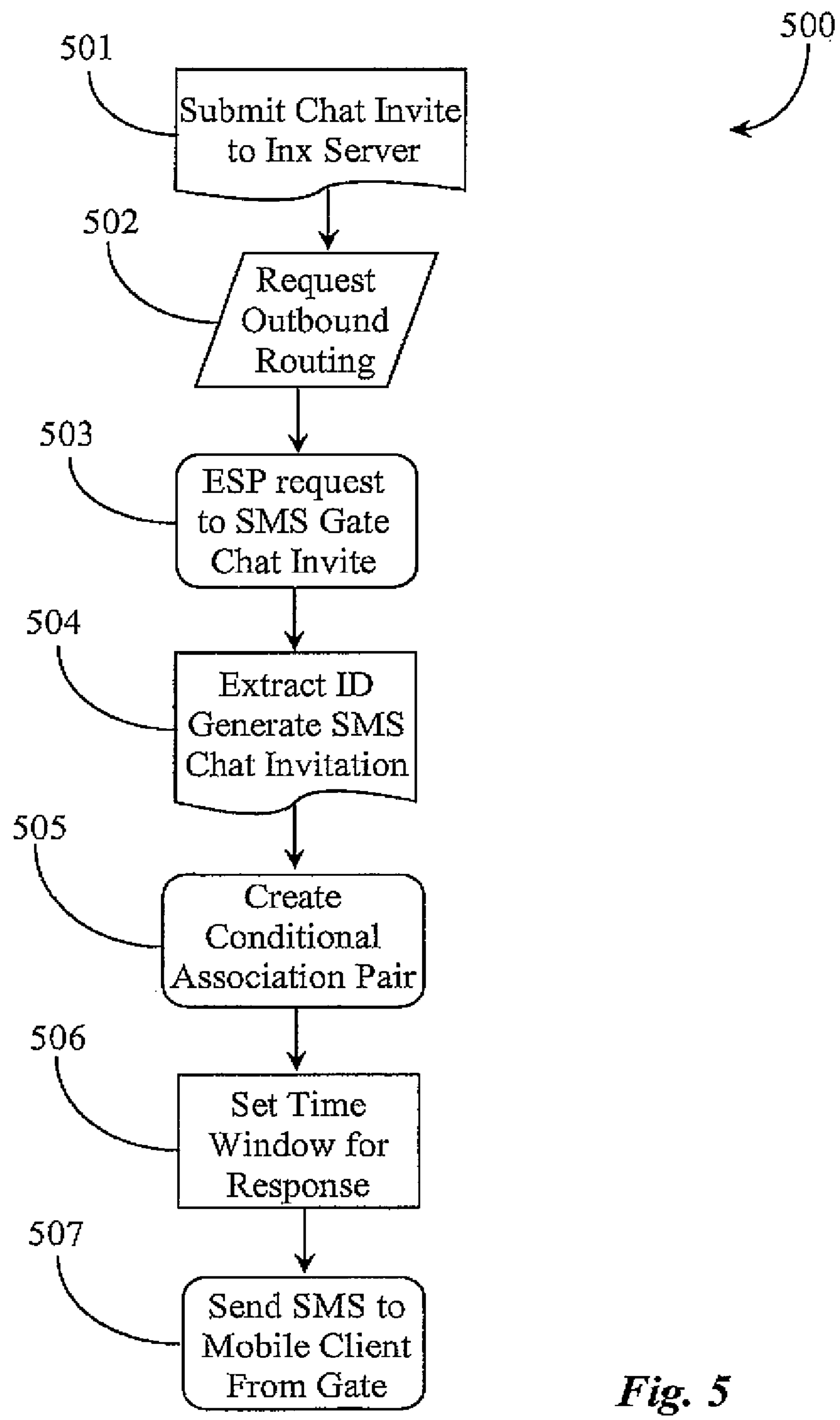
FIG. 5 is a process flow chart illustrating steps for inviting a mobile client to chat according to an embodiment of the present invention.

FIG. 5 is a process flow chart illustrating steps 500 for inviting a mobile client to chat according to an embodiment of the present invention. At step 501 a contact center agent having address information of a mobile client prepares and submits a chat invitation request to an interaction server. This process is performed on the agent desktop application with the aid of an SMS support SW installed in the desktop application. The interaction server requests outbound routing strategy from a connected universal routing server at step 502. In this case the instruction is a routing object instructing the SMS gateway to send as a chat invitation to the destination telephone number or address used for the message. At step 503 the interaction server sends an ESP request to the SMS media gateway to generate and send an SMS invitation to chat message to the mobile client indicated as the intended recipient. It is noted herein that one agent may send a chat invitation to more than one mobile client by including each destination address or number in the ESP request.

At step 504 the SMS gateway generates an SMS message including any text sent in the request message body to the ID(s) extracted from the ESP request. The action send SMS “chat invitation” is an ESP server method. At step 505 the SMS gateway creates a pair association but marks it as “sleeping” or temporarily inactive for a specified period of time allotted for receiving a response(s) to the invitation(s). In the case of a chat invitation SMS message going out to a single mobile client, the time window is the allotted time between message send and expectation of a positive response from the mobile client. The message body may indicate to the mobile client to reply to the message only if you want to chat. In the case of multiple mobile clients invited to chat in a single SMS outbound message, the time window may be extended if only a few responses come in within the original time window allotted.

At step 507 the SMS invitation to chat is sent to one or more mobile clients in the proprietary formats generic to their SMS carriers. For outgoing data streams, the protocol adapter and multiplexer may demux the SMS stream and may convert the SMS outbound message protocol back to the proprietary protocol versions required for the mobile clients to view and reply to the messages.

Figure 6:
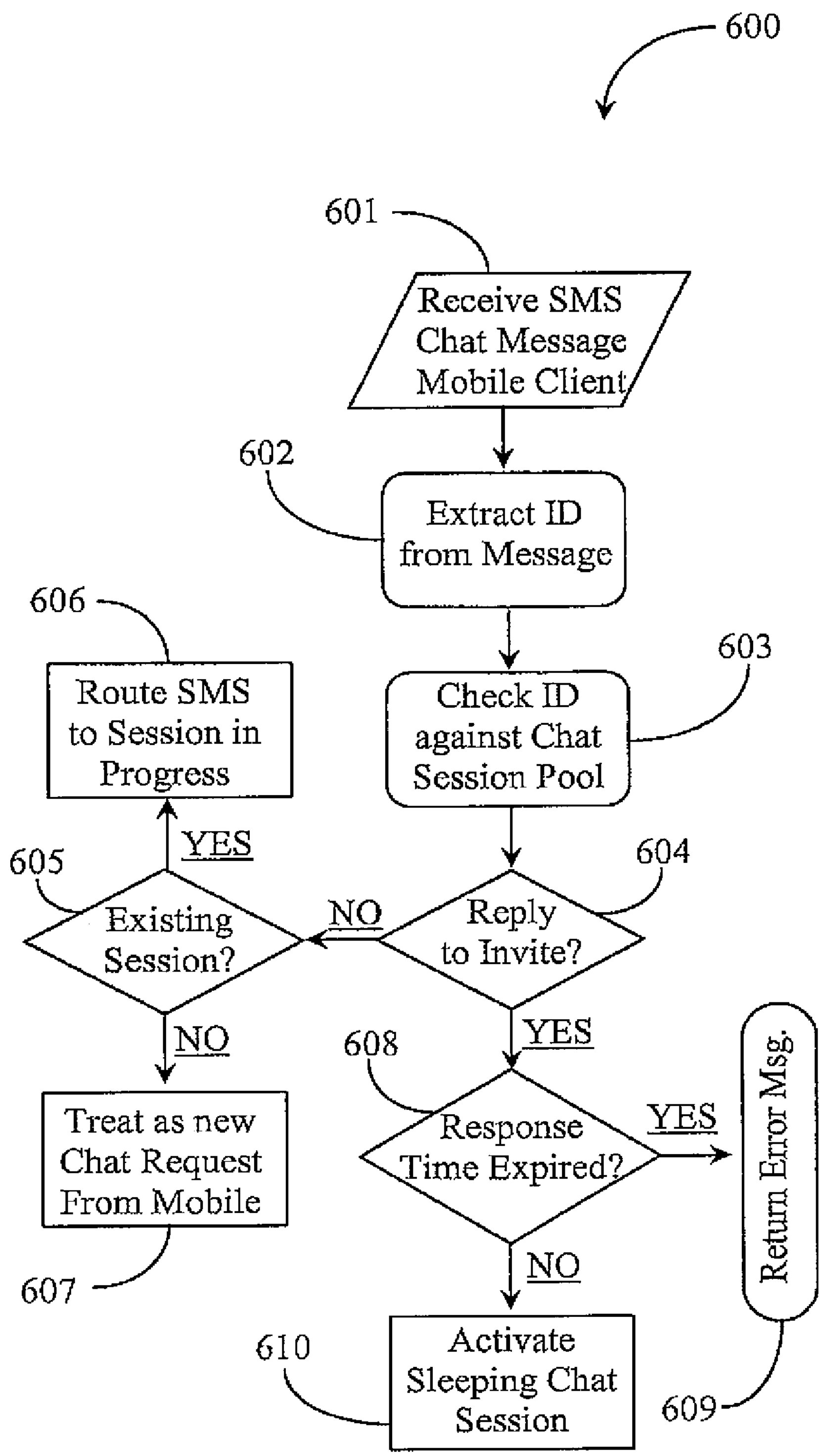
FIG. 6 is a process flow chart illustrating steps for routing an incoming SMS relative to an existing or pending chat session according to an embodiment of the present invention.

FIG. 6 is a process flow chart 600 illustrating steps for routing an incoming SMS relative to an existing or pending chat session according to an embodiment of the present invention. At step 601 an SMS message is received at an SMS gateway and is determined to be chat mode. At step 602 the identification of the mobile client is extracted from the message. At step 604 the system may determine if the message received is a reply to a recent invitation sent out by an agent or intelligent response system. This may be accomplished by maintain the identifications of the mobile clients targeted in the outbound campaign in a list available to the gateway.

If the message is not a reply to an invitation at step 604, the system may check the mobile client identification against the chat session pool to see if it matches an existing chat session in progress at step 605. If it matches an existing session in step 605, the SMS gateway forwards the SMS message directly to the chat server and session at step 606. If the incoming message is not a reply to an invitation as determined at step 604 and does not match an existing session as determined at step 605, the SMS gateway may treat the SMS message as a new request for chat as described in FIG. 4 steps 412 through 417.

If the system determines that the message received is a reply to an outbound invitation to chat at step 604, the system may check to see if the allotted time window for receiving the reply message has expired at step 608. If the response window has expired at step 608, an error message may be returned to the mobile client at step 609 in the form of an automated SMS message generated and sent by the gateway. If the system determines that the response window has not expired at step 608, the SMS gateway activates the sleeping chat session reserved in the chat session pool at step 610. It is noted that the SMS gateway in creating a sleeping session may reserve a session ID and server selection ahead of time so that when it is activated at step 610 the chat server is notified to activate the reserved session. A follow-up step may be added wherein the SMS gateway enables message forwarding between chat session and server and the mobile client.

It will be apparent to one with skill in the art that the SMS communication system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system to route short message service (SMS) messages, the system comprising:

a processor; and a memory coupled to the processor, wherein the memory has stored thereon instructions that, when executed by the processor, causes the processor to:

receive a single message stream in a common protocol, wherein the single message stream comprises multiple SMS messages from multiple source devices operating variant protocols that have been multiplexed into the single message stream in the common protocol;

parse the single message stream for identifying an intent of at least one of the multiple SMS messages;

forward the at least one of the multiple SMS messages in the single message stream to a server, wherein the server is determined based on the identified intent; and in response to receiving a reply message from the server, route the reply message to a customer end-point device.

2. The system of claim 1, wherein the multiple sources include one or more short message service centers (SMSCs) and one or more mobile network modems.

3. The system of claim 1, wherein the common protocol is hypertext transport protocol (HTTP).

4. The system of claim 1, wherein the common protocol is short message peer-to-peer (SMPP) protocol.

5. The system of claim 1, wherein the server includes a chat server and the endpoint device includes a chat session.

6. The system of claim 5, wherein the chat session includes a session in progress.

7. The system of claim 5, wherein the chat session includes a session created upon request.

8. The system of claim 1, wherein the server includes an interaction server for representing SMS message events pending further routing.

9. The system of claim 1, wherein the endpoint device includes a computing device and an application running on the computing device.

10. A method for routing short message service (SMS) messages, the method comprising:

receiving, by a processor, a single message stream in a common protocol, wherein the single message stream comprises multiple SMS messages from multiple source devices operating variant protocols that have been multiplexed into the single message stream in the common protocol;

parsing, by the processor, the single message stream for identifying an intent of at least one of the multiple SMS messages;

forwarding, by the processor, the at least one of the multiple SMS messages in the single message stream to a server, wherein the server is determined based on the identified intent; and in response to receiving a reply message from the server, routing, by the processor, the reply message to a customer endpoint device.

11. The method of claim 10, wherein the multiple sources include one or more short message service centers (SMSCs) and one or more mobile network modems.

12. The method of claim 10, wherein the common protocol is hypertext transport protocol (HTTP).

13. The method of claim 10, wherein the common protocol is short message peer-to-peer (SMPP) protocol.

14. The method of claim 10, wherein the server includes an interaction server for representing SMS message events pending further routing.

15. The method of claim 10, wherein the endpoint device includes a computing device and an application running on the computing device.

16. The method of claim 10, wherein the intent is engaging in a chat session, and the server is a chat server.

17. The method of claim 16, wherein the chat session includes a session created upon request, and the method further includes routing the at least one of the SMS messages to the session created upon request.

18. The method of claim 16, wherein the chat session includes a session in progress, and the method further includes routing the at least one of the SMS messages to the session in progress.

* * * * *